US012744454B2

(12) United States Patent
Smith et al.

(10) Patent No.: US 12,744,454 B2
(45) Date of Patent: Sep. 22, 2026

(54) METHOD AND AN ELECTRONIC SYSTEM FOR SOFT RECOVERY FOR SWITCHED MODE POWER SUPPLIES

(71) Applicant: NEXPERIA B.V, Nijmegen (NL)

(72) Inventors: Jacob Smith, Dallas, TX (US); Alejandro Vera, Dallas, TX (US); Jairo Olivares, Dallas, TX (US)

(73) Assignee: Nexperia B.V., Nijmegen (NL)

( * ) Notice: Subject to any disclaimer, the term of this patent is extended or adjusted under 35 U.S.C. 154(b) by 139 days.

(21) Appl. No.: 18/925,256

(22) Filed: Oct. 24, 2024

(65) Prior Publication Data

US 2026/0121516 A1 Apr. 30, 2026

(51) Int. Cl.
*H02M 1/32* (2007.01)
*H02M 1/36* (2007.01)

(52) U.S. Cl.
CPC ............... *H02M 1/32* (2013.01); *H02M 1/36* (2013.01)

(58) Field of Classification Search
CPC .................................. H02M 1/32; H02M 1/36
USPC ........................................................ 323/234
See application file for complete search history.

(56) References Cited

U.S. PATENT DOCUMENTS 4,791,544 A 12/1988 Gautherin et al.
2011/0006748 A1 * 1/2011 Jang ........................ H02M 1/36 323/299

* cited by examiner

*Primary Examiner* — Tomi Skibinski
(74) *Attorney, Agent, or Firm* — Ruggiero McAllister & McMahon LLC

(57) ABSTRACT

A method for soft recovery for switched mode power supplies includes: (a) detecting a drop of the output voltage value FB; (b) starting the output voltage values FB recovery using a current FB value stored as a Vref start value from which the recovery is to be made; (c) detecting the start of the recovery of the output voltage; (d) generating a timing pulse; (e) measuring a FB value on the rising edge of the timing pulse and comparing the FB value with the Vref value, and if the FB value is greater than the Vref value, storing the FB value and setting the FB value as the new Vref start value from which the recovery is to be made going forward; and (f) repeating step (d) and (e), after a preset time delay, until the FB value is less than or equal to the Vref for the FB value.

8 Claims, 6 Drawing Sheets

METHOD AND AN ELECTRONIC SYSTEM FOR SOFT RECOVERY FOR SWITCHED MODE POWER SUPPLIES

BACKGROUND OF THE DISCLOSURE

1. Field of the Disclosure

The present disclosure relates, in general, to electronics and, more particularly, to a soft recovery circuit for power supplies.

2. Description of Related Art

Document US20110006748A1 has a power supply comprising an input voltage detector that detects a drop in input voltage that corresponds to an input voltage loss. A power converter is coupled to the input voltage detector. The power converter, which can be any type of Switched Mode Power Supply, has a switching device that is actuated in accordance with a duty cycle. A duty cycle adjuster is responsive to the detection of the drop in the input voltage to adjust the duty cycle of the switching device in order to limit an input current surge through the switching device below a desired level after the input voltage returns.

Document U.S. Pat. No. 4,791,544A has a regulating control circuit for a single-ended switching power supply, which includes means for controlling the switching duty cycle during start-up, normal operation, and current limiting modes. Normal operation utilizes a duty cycle of less than about 50%, but low input voltage operation can occur for limited times at duty cycles up to 70%-80%. A time base generator defines the maximum permissible switch conduction time, as well as the switching rate. During start-up, input current is restricted to reduce dissipation within the control circuit. The start-up duty cycle is also maintained at a low value by extending the switch non-conduction time. In the current limiting mode, the duty cycle is reduced as a function of current demand to achieve constant current operation over a given range of output voltages and to achieve current foldback below such range. In current foldback, the switch non-conduction period is extended to obtain unusually low duty cycles in near shorted output conditions.

The prior art mainly shows ways of limiting the current or shutting off the switching operation entirely in the event of a fault. The prior art is also mainly limited to one type of fault and not multiple faults at the same time. The present disclosure details a way of detecting either low input voltage or current surge faults as well as how to perform a soft recovery from these detected surge faults.

Accordingly, it is a goal of the present disclosure to provide an improved method for soft recovery for switched mode power supplies with voltage overshoot limitation during the recovery process.

SUMMARY OF THE DISCLOSURE

When a Switched Mode Power Supply (SMPS) is operating in a steady state, large surge currents and input voltage deficiencies can cause significant output voltage drops. Upon removal of the current surge, many SMPS will have a voltage overshoot due to the surge current now being redirected into the output capacitor. The overshoot and subsequent ringing are undesired. In many SMPS topologies, especially ones dealing with higher currents, it is beneficial to employ circuitry to quickly determine when the output regulation recovery has begun, followed by coordinating a gentle return to the desired regulation voltage, thus avoiding an unwanted, undesirable overshoot (called soft-recovery).

The present disclosure relates to a method for soft recovery operation for switched mode power supplies, which comprises an output voltage values detection circuit (RDAC), a voltage recovery detection circuit, a timing pulse generator, a voltage comparator circuit, and a reference voltage values storing circuit.

A method according to the present disclosure comprises the following steps:

(a) detecting a drop of the output voltage value feedback (FB) using a drop detection circuit;
(b) starting the output voltage values FB recovery with the voltage recovery circuit (RDAC) using a current FB value stored as a voltage reference (Vref) start value from which the recovery is to be made;
(c) detecting the start of the recovery of the output voltage using the voltage recovery detection circuit;
(d) generating a timing pulse using a timing pulse generator;
(e) measuring a FB value on the rising edge of the timing pulse and comparing the FB value with the Vref value, using the voltage comparator circuit, and if the FB value is greater than the Vref value, storing the FB value and setting the FB value as the new Vref start value from which the recovery is to be made going forward; and
(f) repeating steps (d) and (e), after a preset time delay, until the FB value is less or equal to the Vref for such FB value, thereby completing the soft recovery operation.

In normal operation, when detecting a drop of the output voltage value FB using a drop detection circuit in step (a.), the drop of the output voltage value FB detection occurs when the FB drops a certain value greater than a normal FB voltage fluctuation, measurements error, and noise. Typically, a drop is detected when the FB voltage drops more than 5% of the FB value.

The timing pulses can comprise a clock signal generated by a clock circuit. The timing pulses are typically PWM signal pulses having at least a rising edge.

Preferably, the timing pulses comprise a clock signal generated by a time delay circuit. Preferably, the time delay is adjustable, and the time of delay can be preset.

Preferably, the timing pulses comprise a logical conjunction of the clock circuit signal and the time delay circuit signal. The rampancy of the FB recovery can be controlled by adjusting the length of the delay.

The present disclosure also relates to an electronic system configured for performing the method of soft voltage recovery after voltage drop according to the disclosure. The system has an output voltage values detection circuit (RDAC), a voltage recovery detection circuit, a timing pulse generator, a reference voltage values storing circuit, and a voltage comparator circuit. In the system, a voltage comparator circuit output is connected to the reference voltage storing circuit forming a feedback loop.

As mentioned, load surges and input voltage deficiencies can cause significant disturbances in the output regulation for Switched Mode Power Supplies (SMPS). In many cases, when a surge is removed, the output regulation can overshoot due to considerable inrush current quickly returning to the output cap. With the present disclosure, a method and accompanying system are disclosed by which either low input voltage or current surge faults can be detected properly and how to perform a soft recovery from these detected surge faults.

BRIEF DESCRIPTION OF THE DRAWINGS

The disclosure will now be discussed with reference to the drawings.

DETAILED DESCRIPTION OF THE DISCLOSURE

Figure 4:
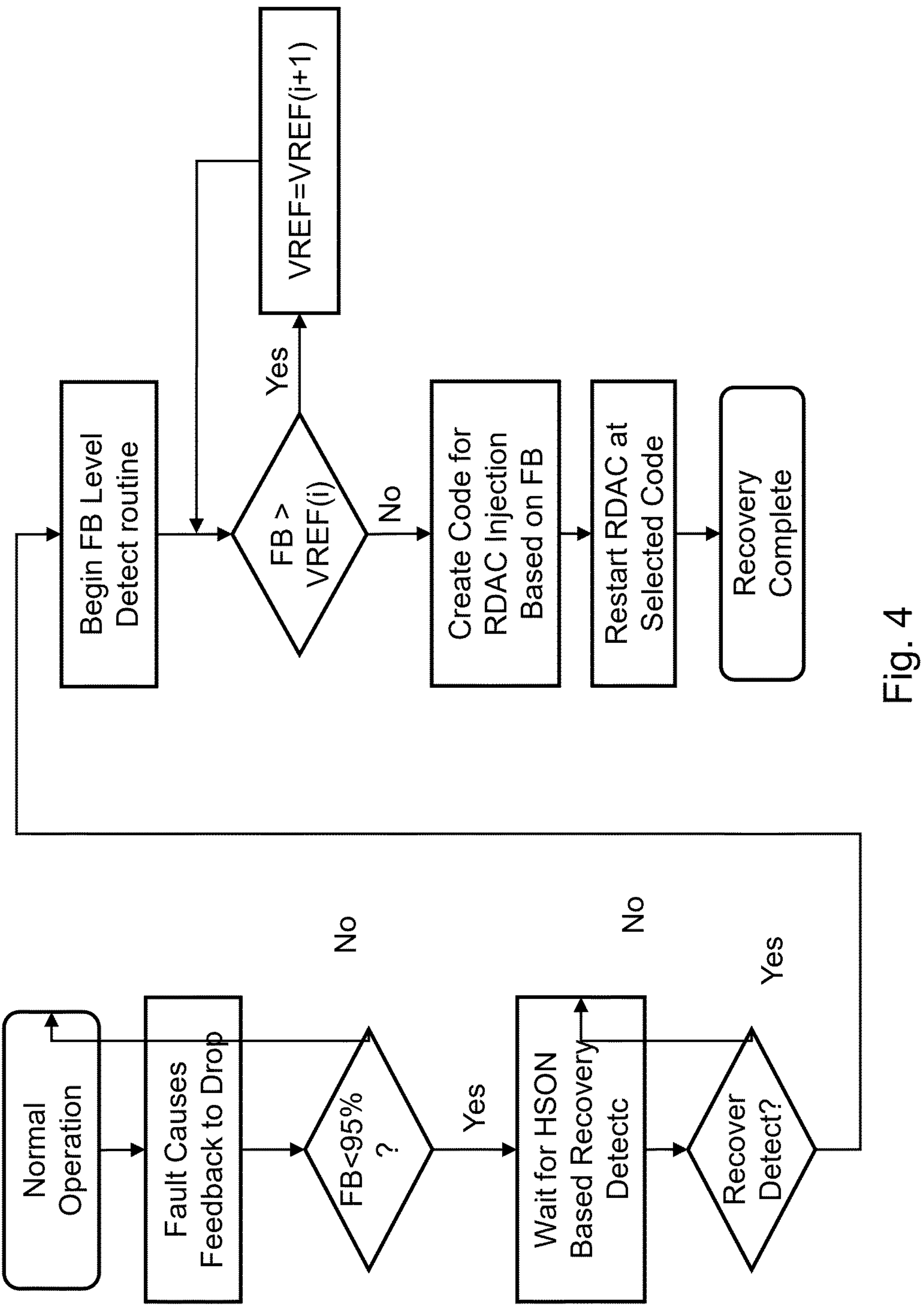
FIG. 4 shows a block diagram of an implementation of a method for soft recovery for switched mode power supplies according to the disclosure.

An example of the disclosure is a method of detecting when an output regulation recovery has begun using a memory based dv/dt detection scheme followed by the re-use of a pre-existing soft start mechanism (RDAC) in order to slowly recover regulation starting from the output voltage present at the time of the surge recovery. See FIG. 4. By storing the FB voltage from previous HSON pulses on one capacitor and comparing this FB voltage with the output voltage during subsequent HSON pulses, a determination of the relative dv/dt direction can be obtained.

Figure 5:
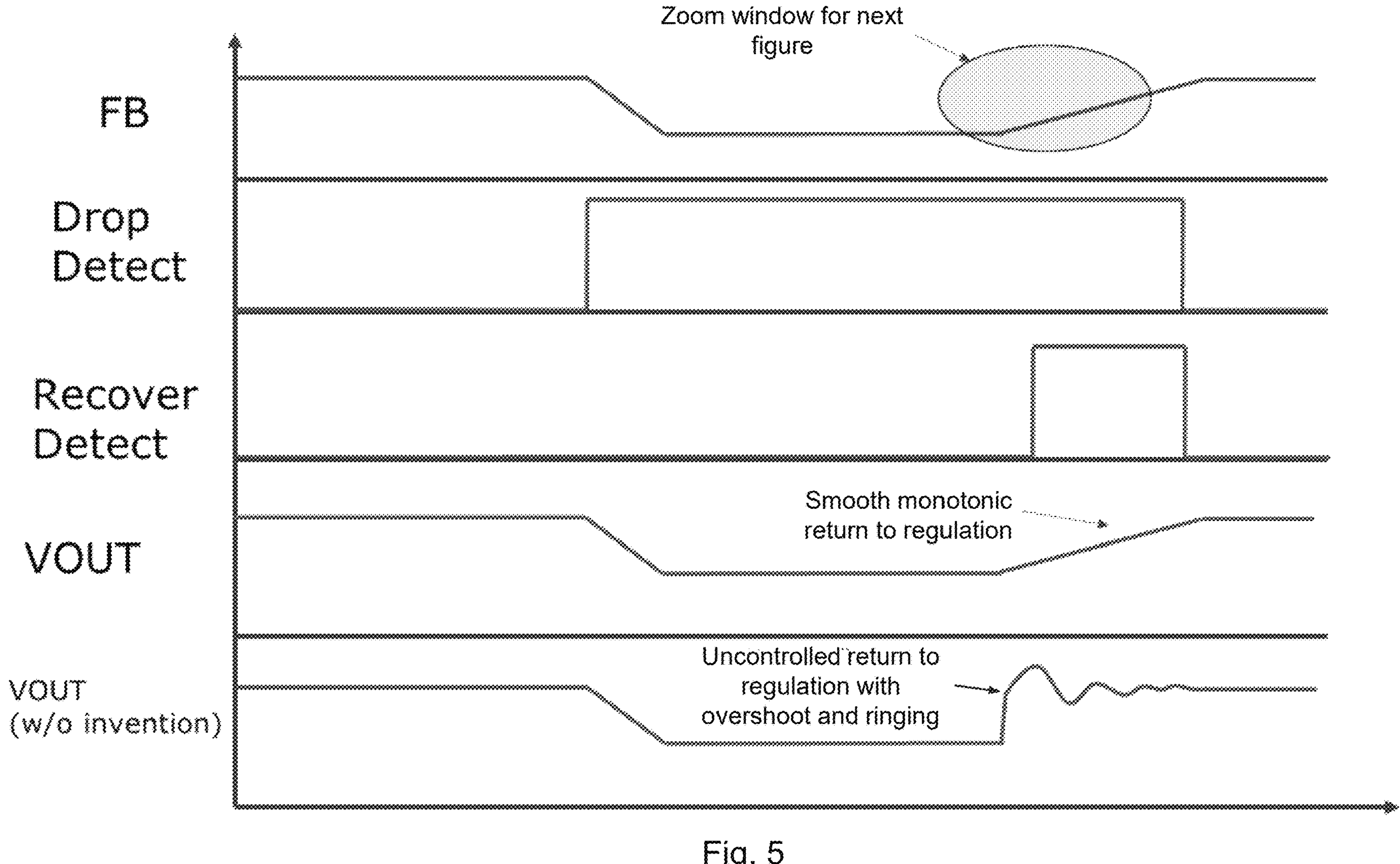
FIG. 5 shows soft recovery waveforms showing a recovery process with and without application of the soft recovery method according to the disclosure

Once a positive slope of the relative dv/dt direction is detected, the current FB voltage is relayed to an RDAC based soft-start circuitry, which regains control of the regulation loop reference to slowly return the output to the desired voltage. See FIG. 5. The sensitivity of the recovery detection can be controlled by adjusting how many HSON pulses are allowed between the subsequent comparison of the stored FB values.

According to an example of the disclosure, the method is performed using power supplies which can comprise an output voltage values detection circuit RDAC, a voltage recovery detection circuit, a timing pulse generator, a voltage comparator circuit, and a reference voltage values storing circuit.

In an example of the disclosure, a soft recovery method is proposed using power supplies comprising a voltage reference selection circuit that comprises a Vref storage unit, as well as a voltage comparator circuit for comparing a stored Vref value with the FB values. The voltage reference selection circuit input of FIG. 1 utilizes the output of the recovery detection circuit of FIG. 2. The Recovery Detection circuit input is an output of the Sample Delay Control circuit, which is connected to the Phase Generator circuit of FIG. 3.

Figure 6:
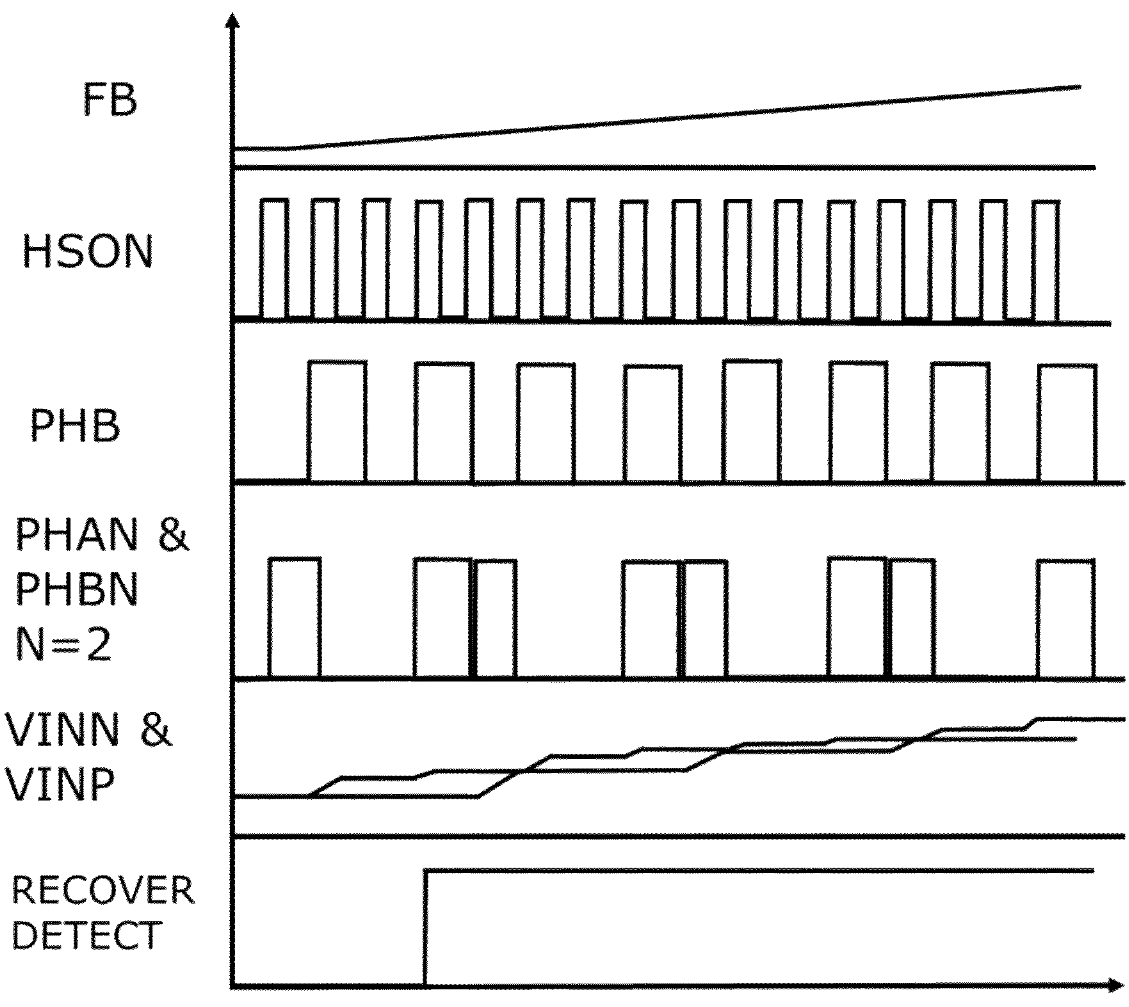
FIG. 6 shows time charts of the z soft recovery method with the applied recovery detection based controlled using timing pulses.

A method in this example of the disclosure comprises the following steps:

(a) detecting a drop of the output voltage value FB using the drop detection circuit of the power supply;

(b) starting the output voltage values FB recovery with the voltage recovery circuit (RDAC) using a current FB value stored as a voltage reference (Vref) start value from which the recovery is to be made;

(c) detecting the start of the recovery of the output voltage using the voltage recovery detection circuit;

(d) generating a timing pulse using a timing pulse generator;

(e) measuring a FB value on the rising edge of the timing pulse and comparing the FB value with the Vref value, using the voltage comparator circuit, and if the FB value is greater than the Vref value, storing the FB value and setting the FB value as the new Vref start value from which the recovery is to be made going forward; and (f) repeating steps (d) and (e), after a preset time delay, until the FB value is less than or equal to the Vref for such FB value, thereby completing the soft recovery operation as shown in FIG. 6.

In a particular example of the disclosure, the detected drop of the output voltage value FB in step (a) occurs when the FB drops more than 5%. The timing pulses used when performing the method can comprise a clock signal generated by a clock circuit. Alternatively, the timing pulses can also comprise a clock signal generated by a time delay circuit. In particular, the time delay length is adjustable, and the time of delay can be preset, typically in the range from 1 to 6 clock cycles.

In another example of the disclosure, the timing pulses can comprise a logical conjunction (AND gate logic) of a clock circuit signal and a time delay circuit signal.

Furthermore, the recovery detection sensitivity can be controlled by adjusting the length of the time delay. This determines how long the FB voltage recovery is to proceed between a new Vref value being set, i.e., to store a new Vref value. The sensitivity of the recovery detection can be controlled by tuning this time delay. The FB recovery slope will still be determined by the original soft-start speed.

Figure 1:
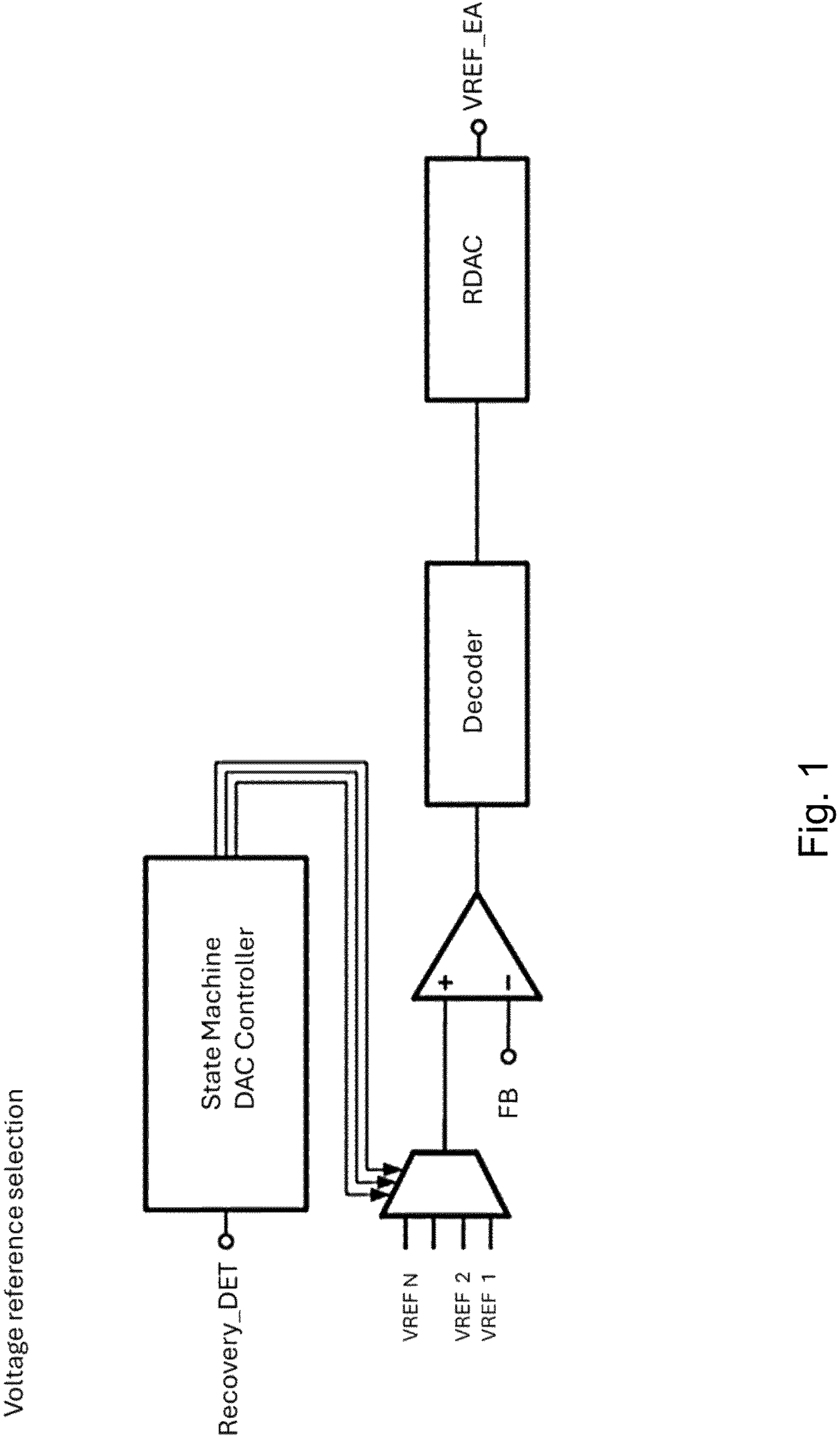
FIG. 1 shows a circuit diagram of the Voltage reference selection part of a Soft-Recovery Circuit.
Figure 2:
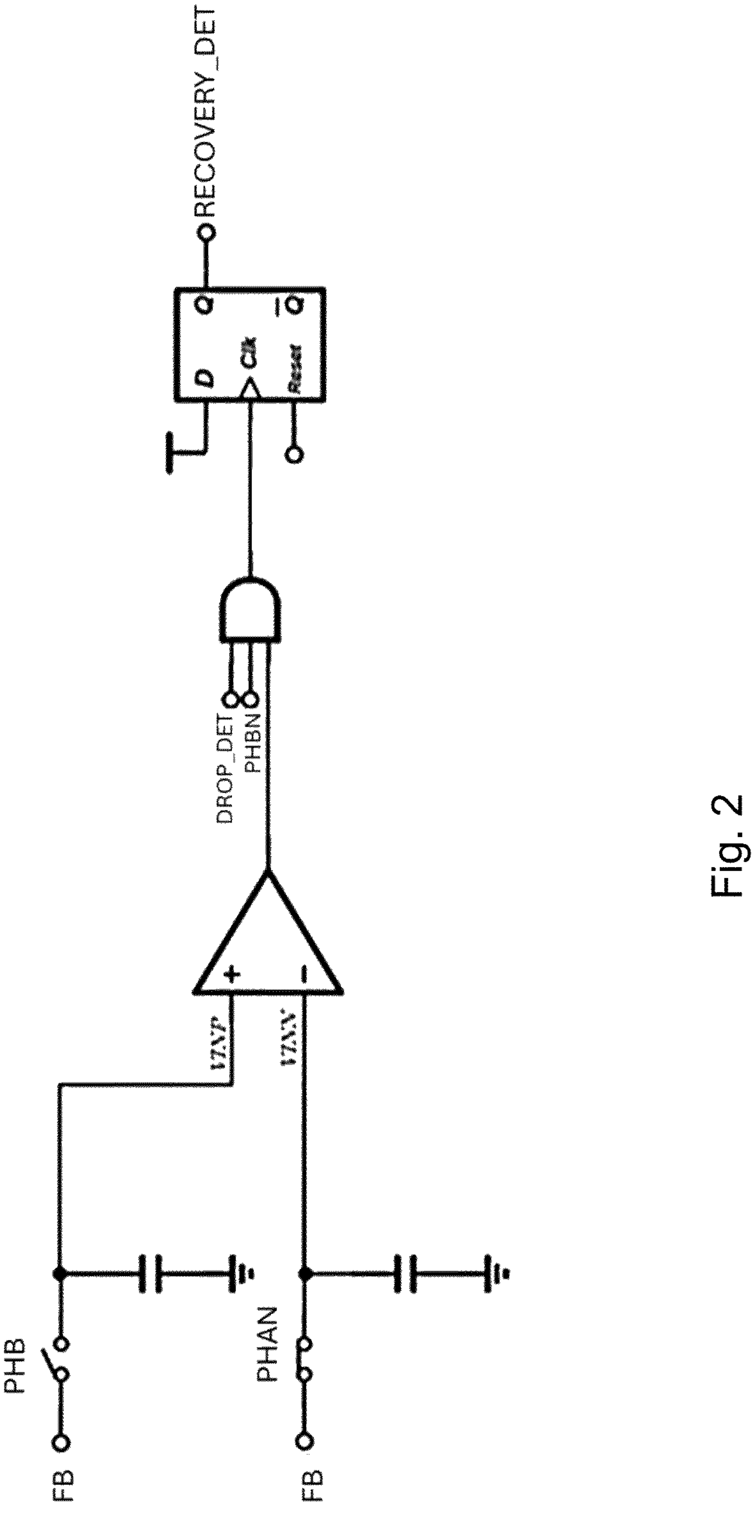
FIG. 2 shows a circuit diagram of the Recovery detection part of the Soft-Recovery Circuit.
Figure 3:
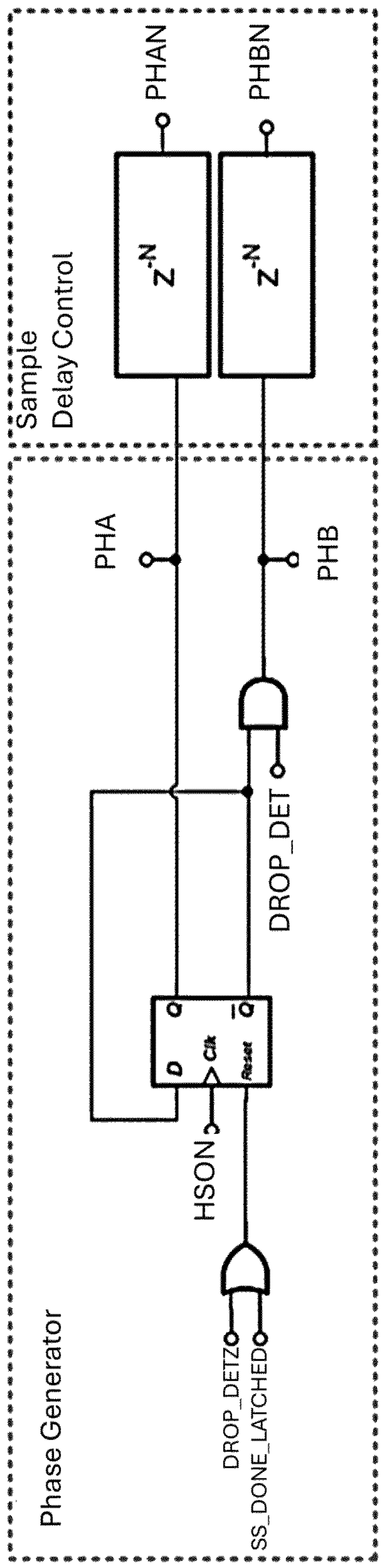
FIG. 3 shows a circuit diagram of the Phase Generator and sample delay control unit parts of the Soft-Recovery Circuit.

A further example of the disclosure is shown in FIGS. 1 to 3 and pertains to an electronic system configured for performing the method of soft voltage recovery after a voltage drop as disclosed herein. The electronic system comprises an output voltage values detection circuit RDAC, a voltage recovery detection circuit, a timing pulse generator, a reference voltage values storing circuit, and a voltage comparator circuit. In particular, an output of the voltage comparator circuit is connected to the reference voltage storing circuit, thereby forming a feedback loop.

The method according to the disclosure is very detectable. Its usage can be detected efficiently through the disclosed closed loop operation. It implements an external supply to force a FB value to be lower than expected for a predetermined time, and subsequently releases the forced FB voltage and measures the output voltage slew rate and the time at which the slew rate control is initiated. Once the slew rate control is initiated after a fixed number of HSON pulses then the method according to the disclosure is utilized. If the slew rate is fixed for various loads and FB release points, the method according to any of the mentioned examples can be implemented.

LIST OF ABBREVIATIONS

FB Feedback
HSON High-Side On Pulse
Vref reference voltage value
Vref1 first reference voltage value
VrefN Nth reference voltage value
RDAC Resistive Digital to Analog Converter DAC Digital to analog converter
PHAN Phase A delayed by N Pulses
PHBN Phase B delayed by N Pulses
VINN Inverted Voltage Input
VINP Non-Inverted Voltage Input
PHA Phase A
PHB Phase B
Z−n subtract n number of pulses from the current pulse
N−Nth number e.g. number of pulses

The invention claimed is:

1. A method for soft voltage recovery for switched mode power supplies that comprise an output voltage values detection circuit, a voltage recovery detection circuit, a timing pulse generator, a voltage comparator circuit, and a reference voltage values storing circuit, the method comprising the following steps:

(a) detecting a drop of an output voltage value FB using a drop detection circuit;

(b) starting the output voltage values FB recovery with the voltage recovery detection circuit using a current FB value stored as a voltage reference (Vref) start value from which the soft voltage recovery is to be made;

(c) detecting the start of the soft voltage recovery of the output voltage using the voltage recovery detection circuit;

(d) generating a timing pulse using a timing pulse generator;

(e) measuring an FB value on a rising edge of the timing pulse and comparing the FB value with the Vref value using the voltage comparator circuit, and if the FB value is greater than the Vref value, storing the FB value and setting the FB value as a new Vref start value from which a recovery is to be made going forward; and (f) repeating steps (d) and (e), after a preset time delay, until the FB value is less than or equal to the Vref for such FB value, thereby completing the soft voltage recovery.

2. The method according to claim 1, wherein the drop of the output voltage value FB in step (a) is detected when the FB drops more than 5%.

3. The method according to claim 1, wherein the timing pulse comprises a clock signal generated by a clock circuit.

4. The method according to claim 1, wherein the timing pulse comprises a clock signal generated by a time delay circuit.

5. The method according to claim 4, wherein the clock signal has a time delay length that is adjustable.

6. The method according to claim 4, wherein the clock signal has a time delay length that can be preset.

7. The method according to claim 4, wherein the timing pulse comprises a logical conjunction of the clock signal and the time delay circuit signal, and the method further comprises controlling a sensitivity of the recovery detection by adjusting a length of a time delay.

8. An electronic system comprising:

an output voltage values detection circuit;

a voltage recovery detection circuit;

a timing pulse generator;

a reference voltage values storing circuit; and a voltage comparator circuit, wherein the voltage comparator circuit output is connected to the reference voltage values storing circuit forming a feedback loop, and wherein the system is configured to:

(a) detect a drop of an output voltage value FB using a drop detection circuit;

(b) start the output voltage values FB recovery with the voltage recovery detection circuit using a current FB value stored as a voltage reference (Vref) start value from which the soft voltage recovery is to be made;

(c) detect the start of the soft voltage recovery of the output voltage using the voltage recovery detection circuit;

(d) generate a timing pulse using a timing pulse generator;

(e) measure an FB value on a rising edge of the timing pulse and comparing the FB value with the Vref value using the voltage comparator circuit, and if the FB value is greater than the Vref value, storing the FB value and setting the FB value as a new Vref start value from which the recovery is to be made going forward; and (f) repeat step (d) and (e), after a preset time delay, until the FB value is less than or equal to the Vref for the FB value, thereby completing the soft voltage recovery.

* * * * *